(12) United States Patent
Hiraoka

(10) Patent No.: US 9,033,538 B2
(45) Date of Patent: May 19, 2015

(54) ILLUMINATION APPLIANCE

(75) Inventor: Jun Hiraoka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 175 days.

(21) Appl. No.: 13/981,245

(22) PCT Filed: Jan. 27, 2012

(86) PCT No.: PCT/JP2012/051824
§ 371 (c)(1),
(2), (4) Date: Jul. 23, 2013

(87) PCT Pub. No.: WO2012/117782
PCT Pub. Date: Sep. 7, 2012

(65) Prior Publication Data
US 2013/0301293 A1    Nov. 14, 2013

(30) Foreign Application Priority Data
Feb. 28, 2011 (JP) ................. 2011-042810

(51) Int. Cl.
*F21S 8/00* (2006.01)
*F21S 8/04* (2006.01)
*F21V 7/00* (2006.01)
*F21Y 101/02* (2006.01)
*F21Y 103/02* (2006.01)
*F21V 8/00* (2006.01)

(52) U.S. Cl.
CPC ................. *F21S 8/04* (2013.01); *F21V 7/0016* (2013.01); *F21Y 2101/02* (2013.01); *F21Y 2103/022* (2013.01); *G02B 6/0008* (2013.01); *G02B 6/001* (2013.01); *G02B 6/0038* (2013.01)

(58) Field of Classification Search
CPC ............ F21Y 2103/022; G02B 6/0008; G02B 6/0038
USPC ........................ 362/600, 608, 609, 147, 576
See application file for complete search history.

(56) References Cited

U.S. PATENT DOCUMENTS

| 2012/0069595 | A1* | 3/2012 | Catalano ........................ 362/555 |
| 2013/0021823 | A1* | 1/2013 | Yamagami ..................... 362/613 |
| 2013/0044480 | A1* | 2/2013 | Sato et al. ..................... 362/235 |
| 2013/0051066 | A1* | 2/2013 | Nakamura et al. ............. 362/606 |
| 2014/0347885 | A1* | 11/2014 | Wilcox et al. ................. 362/612 |

FOREIGN PATENT DOCUMENTS

JP     2010-140797 A    6/2010

* cited by examiner

*Primary Examiner* — Ali Alavi
(74) *Attorney, Agent, or Firm* — Birch, Stewart, Kolasch & Birch, LLP

(57) ABSTRACT

Provided is an illumination appliance (1) that illuminates in a direction opposite a direction towards a mounting face (C) thereof, with radiation light of light sources (5) installed on a main-body housing (2) mounted on the mounting face (C), wherein the illumination appliance (1) is equipped with a light-guiding plate (11) that surrounds the outer circumference of the main-body housing (2) and protrudes out in the diameter direction thereof, has a light incident face (11a), and guides light in the diameter direction. Light radiated from the light sources (5) enters the light-guiding plate (11) from the light incident face (11a) thereof, and light radiated from the light-guiding plate (11) illuminates the mounting face (C).

7 Claims, 14 Drawing Sheets

ILLUMINATION APPLIANCE

TECHNICAL FIELD

The present invention relates to an illumination appliance that is installed on a ceiling surface or the like.

BACKGROUND ART

Patent Document 1 discloses a conventional illumination appliance. This illumination appliance is a ceiling light whose main body housing including a light source provided therein is directly fixed to an installation surface, which is an indoor ceiling surface. The light source is composed of a plurality of LEDs arranged with emission surfaces thereof facing downward. The main body housing is covered on its lower side opposite to the installation surface with a transmissive cover that diffusely transmits therethrough emission light from the light source. The transmissive cover is formed to be so curved that an outer peripheral portion thereof descends with respect to a center portion thereof and to have a peripheral surface that is a cylindrical surface perpendicular to the installation surface.

Light emitted from the light source, which has become incident on an inner surface of the transmissive cover at a small incidence angle, is diffusely transmitted through the transmissive cover. As a result, uniform illumination light is emitted downward through the transmissive cover, and thus an indoor environment or the like is illuminated. Furthermore, light emitted from the light source, which has become incident on the inner surface of the transmissive cover at a large incidence angle, is reflected off the transmissive cover and then is emitted upward through the peripheral surface of the transmissive cover.

Illumination appliances of the type directly fixed to an installation surface are configured so that, by illuminating the installation surface to make it bright, they are capable of lessening an impression that a room as a whole is dark. To this end, illumination light is emitted upward through the peripheral surface of the transmissive cover so that the installation surface on which the illumination appliance is installed can be illuminated therewith.

LIST OF CITATIONS

Patent Literature

Patent Document 1: JP-A-2010-140797 (pages 5 to 9, FIG. 1)

SUMMARY OF THE INVENTION

Technical Problem

According to the above-described conventional illumination appliance, however, in order to illuminate a wider area of the installation surface, it is required that the transmissive cover be formed to have an increased length in a direction perpendicular to the installation surface. That is, it is required that light emitted to a side opposite to the installation surface be reflected off the transmissive cover to the installation surface side to illuminate the installation surface. This has led to a problem that, while the amount of light reflected off the transmissive cover to be emitted through the peripheral surface is increased, the amount of illumination light in a direction opposite to the installation surface is decreased, which results in a contrary effect that a room as a whole becomes even darker.

It is an object of the present invention to provide an illumination appliance that is capable of illuminating a wide area of an installation surface without decrease in amount of illumination light in a direction opposite to the installation surface.

Solution to the Problem

In order to achieve the above-described object, the present invention provides an illumination appliance that, by using emission light from a light source provided in a main body housing thereof that is fixed to an installation surface, provides illumination in a direction opposite to the installation surface. The illumination appliance includes a light guide plate that surrounds an outer periphery of the main body housing so as to protrude in a radial direction, has an incidence surface, and guides light. Light emitted from the light source becomes incident on the light guide plate through the incidence surface, and light emitted from the light guide plate is used to illuminate the installation surface.

According to this configuration, the main body housing is fixed to the installation surface in an indoor environment or the like, and the indoor environment or the like is illuminated with light that is emitted from the light source and travels in the direction opposite to the installation surface. Furthermore, the outer periphery of the main body housing is surrounded by the light guide plate that protrudes in the radial direction, and light emitted from the light source becomes incident on the light guide plate through the incidence surface. The light that has become incident on the light guide plate is guided by the light guide plate and then is emitted, toward the installation surface, from between an inner peripheral side and an outer peripheral side of the light guide plate or from an outer peripheral end of the light guide plate. As a result, the installation surface is illuminated in an area thereof around an area covered by the illumination appliance.

Furthermore, in the present invention, in the illumination appliance configured as above, the light guide plate is made of a transparent member.

Furthermore, in the present invention, the illumination appliance configured as above further includes a transmissive cover that covers a side of the main body housing opposite to the installation surface and diffusely transmits therethrough emission light from the light source. Further, the incidence surface is opposed to a peripheral surface of the transmissive cover and is inclined with respect to the installation surface.

According to this configuration, light that is emitted from the light source and travels in the direction opposite to the installation surface is diffusely transmitted through the transmissive cover and illuminates the indoor environment or the like. Furthermore, part of emission light from the light source is reflected off an inner surface of the transmissive cover and becomes incident on the light guide plate through the inclined incidence surface.

Furthermore, in the present invention, in the illumination appliance configured as above, the light guide plate has thickness that is larger in the vicinity of the incidence surface than at a position distant from the incidence surface.

Furthermore, in the present invention, in the illumination appliance configured as above, the light guide plate has a bent portion that is bent from an outer peripheral edge of the light guide plate toward the installation surface. According to this configuration, light guided in the radial direction of the illumination appliance by the light guide plate is bent at the bent portion in a direction to the installation surface and is emitted from the bent portion toward the installation surface.

Furthermore, in the present invention, in the illumination appliance configured as above, the light guide plate is provided with an annular or dot-shaped concave portion. According to this configuration, light guided by the light guide plate is diffused at the concave portion and is emitted in the direction to the installation surface.

Furthermore, in the present invention, in the illumination appliance configured as above, the light source emits light having a plurality of wavelengths, and a prism that disperses and emits guided light is provided at a peripheral portion of the light guide plate. According to this configuration, by the prism, light guided by the light guide plate is dispersed in accordance with wavelengths, and thus illumination light having different colors is shone onto the installation surface.

Advantageous Effects of the Invention

According to the present invention, by a light guide plate surrounding an outer periphery of a main body housing, light is guided in a radial direction and used to illuminate an installation surface, and thus a wide area of the installation surface can be illuminated without decrease in amount of illumination light in a direction opposite to the installation surface.

DESCRIPTION OF EMBODIMENTS

Figure 1:
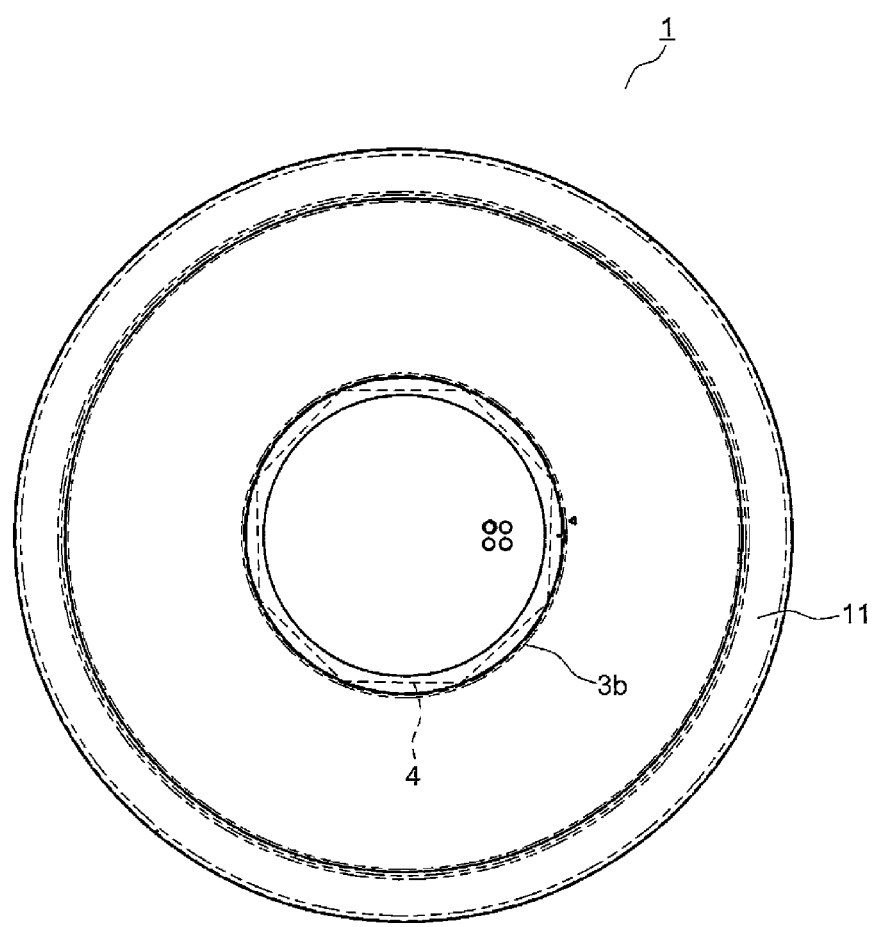
[FIG. 1] is a bottom view showing an illumination appliance of a first embodiment of the present invention.
Figure 2:
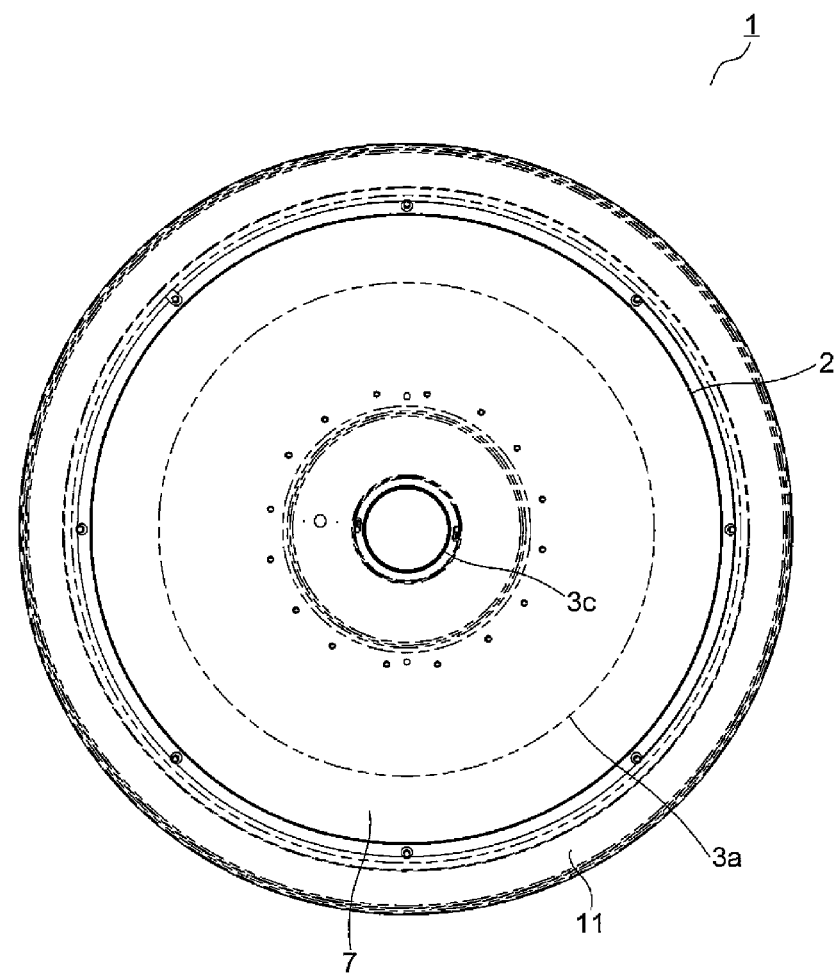
[FIG. 2] is a top view showing the illumination appliance of the first embodiment of the present invention.
Figure 3:
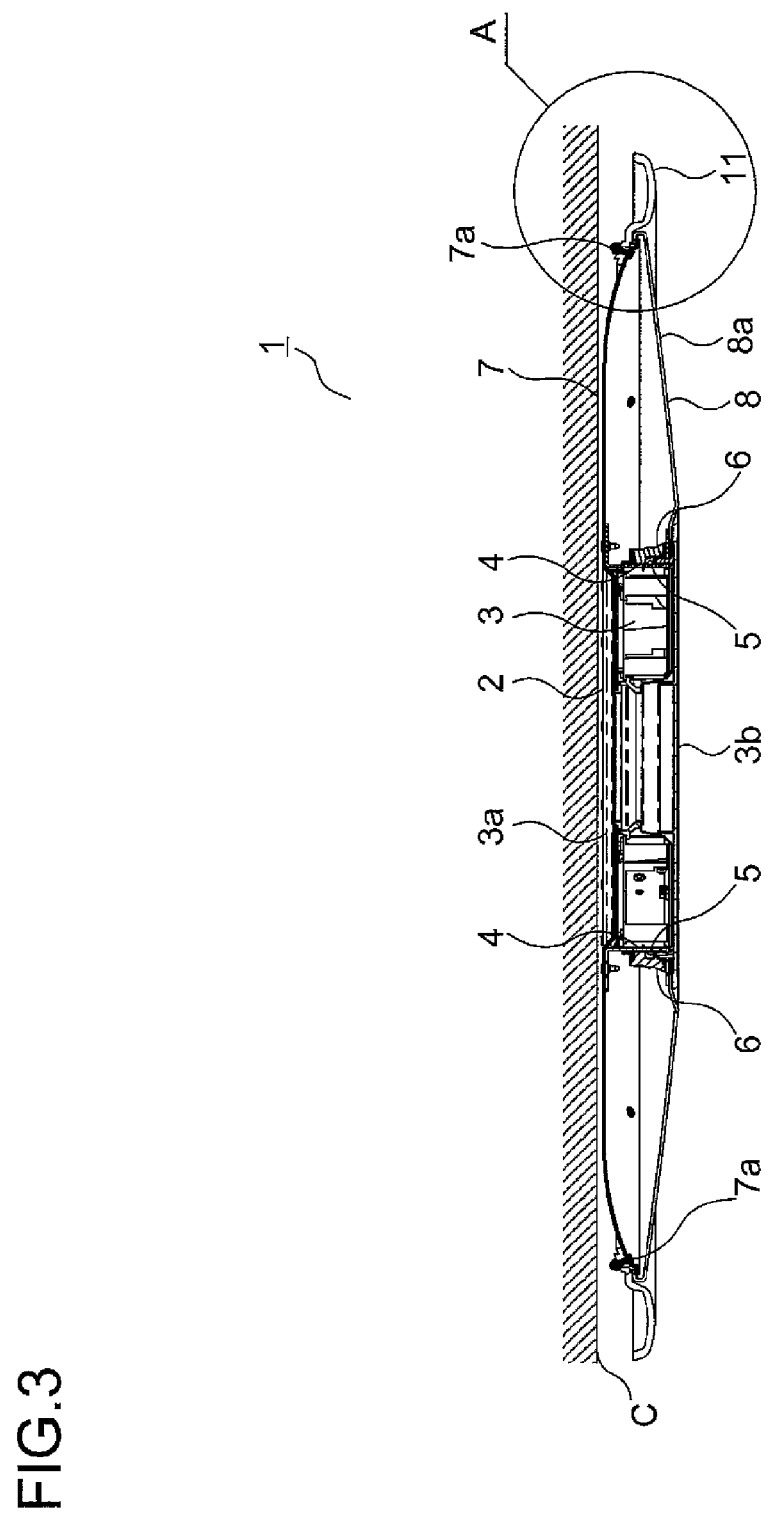
[FIG. 3] is a front sectional view showing the illumination appliance of the first embodiment of the present invention.

The following describes embodiments of the present invention with reference to the appended drawings. FIGS. 1 to 3 show a bottom view, a top view, and a side sectional view of an illumination appliance of a first embodiment, respectively. An illumination appliance 1 is formed to be thin and in a circular shape in planar view and includes a main body housing 2 that is directly fixed to an installation surface C such as an indoor ceiling surface. While the following description assumes that the installation surface C is a ceiling surface, the installation surface C may be an indoor side wall or an indoor floor surface.

The main body housing 2 has an electrical part 3 and a reflection cover 7.

The electrical part 3 is arranged at a center portion of the main body housing 2 and formed in a circular shape in planar view, and is covered with an upper cover 3a provided on the installation surface C side and with a lower cover 3b provided on a side opposite to the installation surface C. Via a fixing portion 3c provided on the upper cover 3a, the main body housing 2 is fixed to the installation surface C and is connected to a commercial power source.

In the electrical part 3, a plurality of substrates (circuit boards) 4 each having a light source 5 such as an LED mounted thereon are arranged in a polygonal shape in planar view. An emission surface of each of the light sources 5 is disposed to be oriented toward a radial direction of the main body housing 2. Thus, from the light sources 5, light is radially emitted toward an outer peripheral side of the illumination appliance 1.

An optical member 6 that covers the light source 5 is mounted to each of the substrates 4. The optical member 6 transmits therethrough light from the light source 5 that has become incident thereon from an inner peripheral side thereof, and emits the light to the outer peripheral side thereof. At this time, the optical member 6 refracts the light being transmitted therethrough in a desired direction and causes the light to be reflected off a reflection surface formed on its lower surface or the like. Thus, a desired amount of light is guided to each of the reflection cover 7, a transmissive cover 8, and a light guide plate 11, which will be described later, so that uniform illumination is performed.

On an outer peripheral side of the upper cover 3a, the reflection cover 7 of a disk shape is provided. The reflection cover 7 reflects downward emission light from the light sources 5. Furthermore, an outer peripheral portion of the reflection cover 7 is curved downward (to the side opposite to the installation surface C).

On an outer peripheral side of the lower cover 3b, the transmissive cover 8 that is mountable to and demountable from the main body housing 2 is provided. The transmissive cover 8 has a bottom portion 8a that is provided so as to be opposed to the reflection cover 7 and a peripheral surface 8b (see FIG. 4) that is a cylindrical surface substantially perpendicular to the installation surface C, and diffusely transmits therethrough emission light from the light sources 5. Furthermore, the bottom portion 8a of the transmissive cover 8 is so curved that an outer peripheral portion thereof ascends with respect to a center portion thereof. The illumination appliance 1, therefore, is formed to be thin at the outer peripheral portion thereof, thus reducing a user's feeling of being oppressed.

Figure 4:
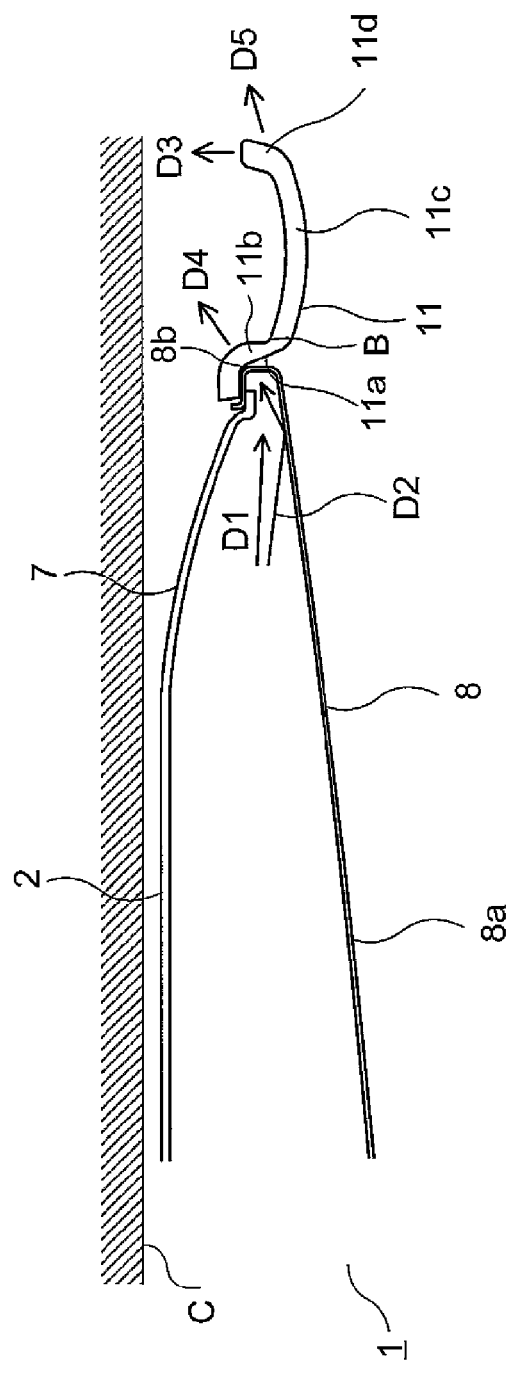
[FIG. 4] is a detailed view of a region A in FIG. 3.

On the outer peripheral side of the reflection cover 7, the light guide plate 11 of an annular shape is mounted with a screw 7a. FIG. 4 shows a detailed view of a region A in FIG. 3. The light guide plate 11 is made of a transparent member of acrylic resin or the like and surrounds an outer periphery of the main body housing 2 so as to protrude in the radial direction. The light guide plate 11 has an incidence portion 11b, an extended portion 11c, and a bent portion 11d.

The incidence portion 11b extends in a vertical direction and has an incidence surface 11a that faces a center direction of the main body housing 2 and is opposed to the peripheral surface 8b of the transmissive cover 8. The incidence surface 11a is formed as an inclined surface that is inclined outward on a lower side thereof with respect to the installation surface C. The extended portion 11c extends in the radial direction from a lower end of the incidence portion 11b and is so curved as to be convex downward. At an outer peripheral portion of the light guide plate 11, the bent portion 11d is bent from an end portion of the extended portion 11c toward the installation surface C and has a curved surface at a tip end thereof. The incidence portion 11b, the extended portion 11c, and the bent portion 11d are formed to be substantially equal in thickness.

In the illumination appliance 1 configured as above, light emitted from the light sources 5 is guided via the optical members 6 to the reflection cover 7, the bottom portion 8a of the transmissive cover 8, and the incidence surface 11a of the light guide plate 11. Light that has travelled from the optical members 6 in a direction to the installation surface C is reflected off the reflection cover 7 in a direction to the bottom portion 8a of the transmissive cover 8 on a down side of the reflection cover 7.

Light that has travelled from the optical members 6 and from the reflection cover 7 in a direction opposite to the installation surface C and become incident on an inner surface of the bottom portion 8a of the transmissive cover 8 at an incidence angle smaller than a critical angle is diffusely transmitted through the transmissive cover 8. As a result, illumination light is emitted downward through the transmissive cover 8, and thus a down side of the illumination appliance 1 is uniformly illuminated.

Light that has travelled from the optical members 6 and from the reflection cover 7 in the direction opposite to the installation surface C and become incident on the inner surface of the bottom portion 8a of the transmissive cover 8 at an incidence angle larger than the critical angle is reflected off the transmissive cover 8. The light reflected off the transmissive cover 8 in a direction to the reflection cover 7 is reflected again off the reflection cover 7 and then is emitted as illumination light through the bottom portion 8a of the transmissive cover 8.

Light (arrow D1) travelling from the optical members 6 in the radial direction of the illumination appliance 1 and light (arrow D2) travelling in the radial direction of the illumination appliance 1 after being reflected off the transmissive cover 8 are transmitted though the peripheral surface 8b of the transmissive cover 8. The light transmitted through the peripheral surface 8b of the transmissive cover 8 becomes incident on the light guide plate 11 through the incidence surface 11a.

At this time, since the incidence surface 11a is inclined, as shown by the arrow D2, light reflected off the bottom portion 8a of the transmissive cover 8 to be inclined in the direction to the installation surface C becomes incident thereon at a decreased incidence angle. This suppresses reflection of said light off the incidence surface 11a. Thus, light guided to a rear side of the reflection cover 7 as a result of being reflected off the incidence surface 11a can be decreased to increase light that becomes incident on the incidence surface 11a, so that light use efficiency can be improved.

The light that has become incident on the light guide plate 11 through the incidence surface 11a is guided by the light guide plate 11 to an outer peripheral side thereof. Then, as shown by an arrow D3, the light is emitted from the tip end of the bent portion 11d toward the installation surface C over a predetermined area. As a result, the installation surface C is illuminated in an area thereof around an area covered by the main body housing 2.

Furthermore, from between an inner peripheral side and the outer peripheral side of the light guide plate 11, part of the light being guided by the light guide plate 11 is emitted toward the installation surface C. At this time, with light emitted from the incidence portion 11b as shown by an arrow D4, the installation surface C is illuminated in an area thereof above the light guide plate 11.

As a result, the installation surface C is illuminated in a wide area thereof on an outer side of an area covered by the main body housing 2, which includes the area thereof above the light guide plate 11, and thus an impression that a room as a whole is dark can be lessened. Furthermore, from an outer peripheral surface of the bent portion 11d bent from the extended portion 11c, light is emitted to an outer peripheral side as shown by an arrow D5, and thus a wider area on an outer side beyond the light guide plate 11 can be illuminated.

According to this embodiment, by the light guide plate 11 surrounding the outer periphery of the main body housing 2, light emitted in the radial direction of the illumination appliance 1, namely, light emitted from the outer periphery of the main body housing, is guided and used to illuminate the installation surface C. That is, emission light from the peripheral surface 8b of the transmissive cover 8 is guided to an outer side of the main body housing 2 and used to illuminate the installation surface C, and thus, unlike the conventional example, it is not required that light emitted to the side opposite to the installation surface C be used to illuminate the installation surface C. Thus, a wide area of the installation surface C can be illuminated without decrease in amount of illumination light in the direction opposite to the installation surface C.

Furthermore, unlike the conventional example, in order to illuminate a wide area of the installation surface C, it is not required that the peripheral surface 8b of the transmissive cover 8 be formed to have an increased length in a direction perpendicular to the installation surface C. That is, the light guide plate 11 is provided to extend in a direction (the radial direction of the main body housing 2) parallel to the installation surface C so as to surround the outer periphery of the main body housing 2, and thus the illumination appliance 1 is not required to have, at the outer peripheral portion thereof, increased thickness in the direction perpendicular to the installation surface C. The illumination appliance 1, therefore, can be formed to be thin, thus being capable of reducing a user's feeling of being oppressed.

Furthermore, since the light guide plate 11 is made of a transparent member, a user can visually recognize that an area of the installation surface C which is covered by the light guide plate 11, has become bright. This makes the user realize that a wide area of the installation surface C is illuminated, helping create an impression that a room as a whole is bright.

Furthermore, since the transmissive cover 8 is provided that covers the main body housing 2 on a side thereof opposite to the installation surface C, and the incidence surface 11a is inclined with respect to the installation surface C, light that is reflected off the bottom portion 8a of the transmissive cover 8 to become incident on the incidence surface 11a can be made incident thereon at a decreased incidence angle. Thus, reflection light reflected off the incidence surface 11a is decreased, so that light use efficiency can be improved.

In this case, more preferably, the incidence surface 11a is so formed that a lower end thereof is disposed immediately below a boundary B on the installation surface C side between the incidence portion 11b and the extended portion 11c. With this configuration, when the illumination appliance 1 is seen from below, the boundary B and a ridge line of the lower end of the incidence surface 11a coincide with each other, and thus an aesthetic impression with reduced occurrence of stripes can be achieved.

Furthermore, since the light guide plate 11 has the bent portion 11d bent from an outer peripheral edge thereof toward the installation surface C, the installation surface C is illuminated with light emitted from the tip end of the bent portion 11d as shown by the arrow D3, and from the outer peripheral surface of the bent portion 11d that is bent, light is emitted to the outer peripheral side as shown by the arrow D5. With this configuration, guided light can be emitted in separate directions that are toward above the light guide plate 11 and toward the outer side beyond the light guide plate 11, respectively. This allows a wider area of the installation surface C to be illuminated.

Furthermore, with light emitted from the incidence portion 11b as shown by the arrow D4, the installation surface C is illuminated in the area thereof above the light guide plate 11, and light is emitted from the bent portion 11d as shown by the arrows D3 and D5 also to the area of the installation surface C on an outer side of the area covered by the light guide plate 11. With this configuration, a wide area of the installation surface C can be illuminated in such a manner that illuminance at the installation surface C gradually decreases with increasing distance from an outer periphery of the illumination appliance 1, and there can be obtained an illumination state where variation in illuminance level at the installation surface C are unlikely to be perceived, and thus user discomfort is reduced.

Figure 5:
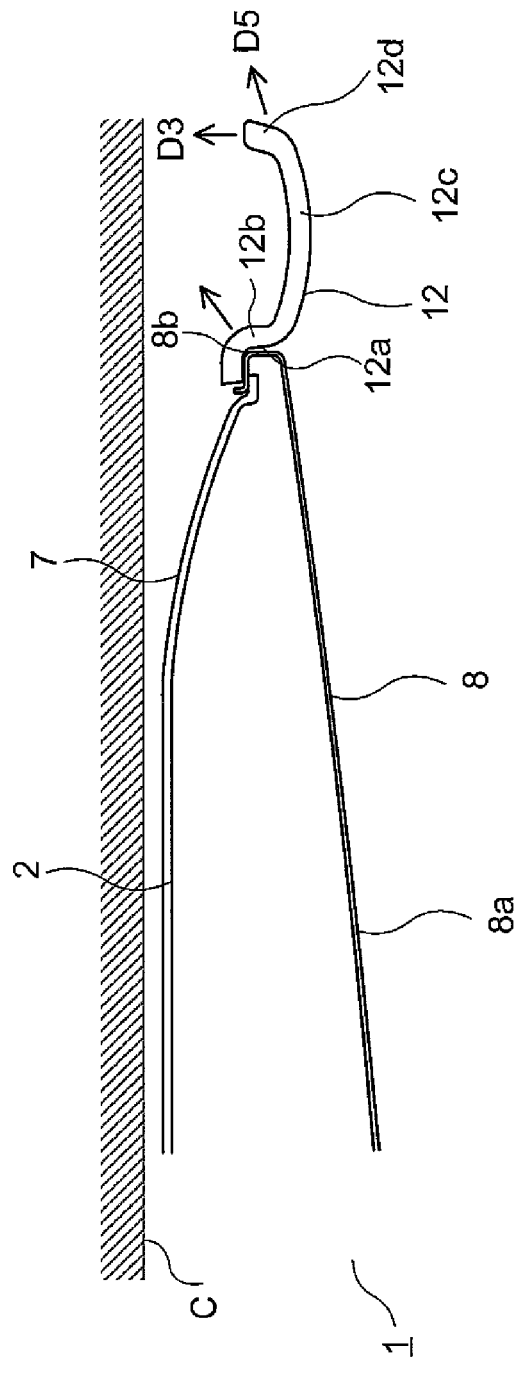
[FIG. 5] is front sectional view showing a relevant portion of an illumination appliance of a second embodiment of the present invention.

Next, FIG. 5 is a front sectional view showing a relevant portion of an illumination appliance of a second embodiment. For the sake of convenience in explanation, like parts corresponding to those in the foregoing first embodiment shown in FIGS. 1 to 4 are denoted by the same reference symbols. In this embodiment, a light guide plate 12 shaped differently from the light guide plate 11 of the first embodiment is provided. Parts other than that are the same as those in the first embodiment.

Similarly to the foregoing light guide plate 11 shown in FIG. 4, the light guide plate 12 is made of a transparent member of acrylic resin or the like and has an incidence portion 12b, an extended portion 12c, and a bent portion 12d. An incidence surface 12a of the incidence portion 12b faces the center direction of the main body housing 2, is opposed to the peripheral surface 8b of the transmissive cover 8, and is formed to be substantially perpendicular to the installation surface C. The extended portion 12c extends in the radial direction from a lower end of the incidence portion 12b and is so curved as to be convex downward. At an outer peripheral portion of the light guide plate 12, the bent portion 12d is bent from an end portion of the extended portion 12c toward the installation surface C. The incidence portion 12b, the extended portion 12c, and the bent portion 12d are formed to be substantially equal in thickness.

According to this embodiment, similar effect to that provided by the first embodiment can be obtained. In this case, since the incidence surface 12a is formed to be substantially perpendicular to the installation surface C, a larger amount of light than in the first embodiment is reflected off the incidence surface 12a in the direction to the installation surface C. In a case, however, where the peripheral surface 8b has a reduced length and the illumination appliance 1 thus is formed to be thin, light that becomes incident on the incidence surface 12a, in a state of being inclined in the direction to the installation surface C, is decreased, and thus decrease in light use efficiency can be suppressed.

Furthermore, light travelling from the optical members 6 in the radial direction of the illumination appliance 1 without being reflected off the bottom portion 8a, which is shown by the arrow D1 (see FIG. 4), becomes incident on the incidence surface 12a substantially perpendicularly thereto. With this configuration, incidence light that becomes incident on the incidence surface 12a can be made incident thereon at a decreased incidence angle, and thus light reflected off the incidence surface 12a can be decreased to increase light that becomes incident on the incidence surface 12a.

Figure 6:
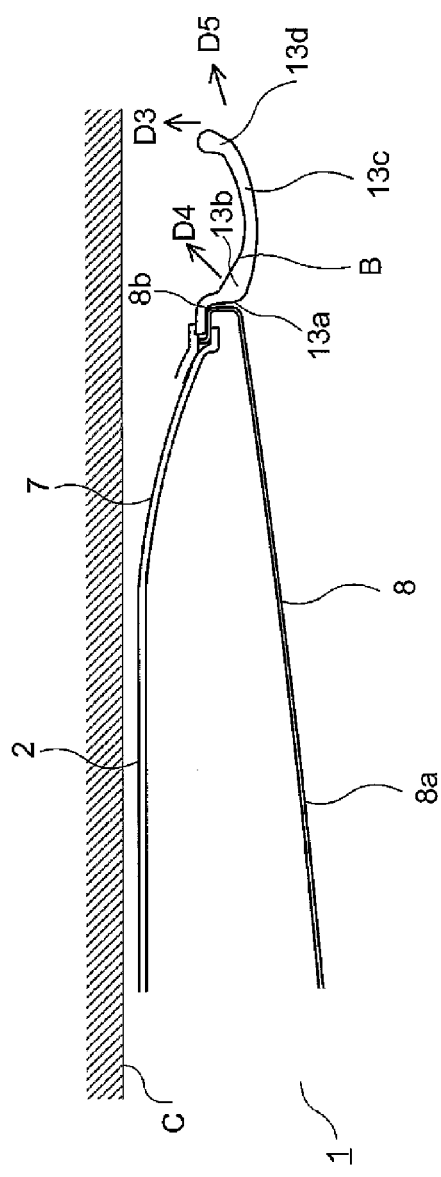
[FIG. 6] is a front sectional view showing a relevant portion of an illumination appliance of a third embodiment of the present invention.

Next, FIG. 6 is a front sectional view showing a relevant portion of an illumination appliance of a third embodiment. For the sake of convenience in explanation, like parts corresponding to those in the foregoing second embodiment shown in FIG. 5 are denoted by the same reference symbols. In this embodiment, a light guide plate 13 shaped differently from the light guide plate 12 of the second embodiment is provided. Parts other than that are the same as those in the second embodiment.

Similarly to the foregoing light guide plate 12 shown in FIG. 5, the light guide plate 13 is made of a transparent member of acrylic resin or the like and has an incidence portion 13b, an extended portion 13c, and a bent portion 13d. An incidence surface 13a of the incidence portion 13b faces the center direction of the main body housing 2, is opposed to the peripheral surface 8b of the transmissive cover 8, and is formed to be substantially perpendicular to the installation surface C. The extended portion 13c extends in the radial direction from a lower end of the incidence portion 13b and is so curved as to be convex downward. At an outer peripheral portion of the light guide plate 13, the bent portion 13d is bent from an end portion of the extended portion 13c toward the installation surface C.

The extended portion 13c and the bent portion 13d are formed to be substantially equal in thickness. Furthermore, the incidence portion 13b of the light guide plate 13 is formed to have thickness that is larger in the vicinity of the incidence surface 13a than at a position distant from the incidence surface 13a. That is, the incidence portion 13b is formed so that light that has become incident through the incidence surface 13a becomes incident on a surface of the incidence portion 13b on the installation surface C side at an angle not less than the critical angle (on the order of about 45 degrees). With this configuration, light emitted from the incidence portion 13b as shown by an arrow D4 is decreased, and light that becomes incident through the incidence surface 13a and is guided is increased. Thus, in addition to obtaining similar effect to that provided by the second embodiment, it is possible to illuminate an outer side of the light guide plate 13 with increased brightness.

In this case, since a lower end of the incidence surface 13a does not coincide with a boundary B on the installation surface C side between the incidence portion 11b and the extended portion 11c, and thus when the illumination appliance 1 is seen from below, an aesthetic impression with increased occurrence of stripes can be achieved.

Figure 7:
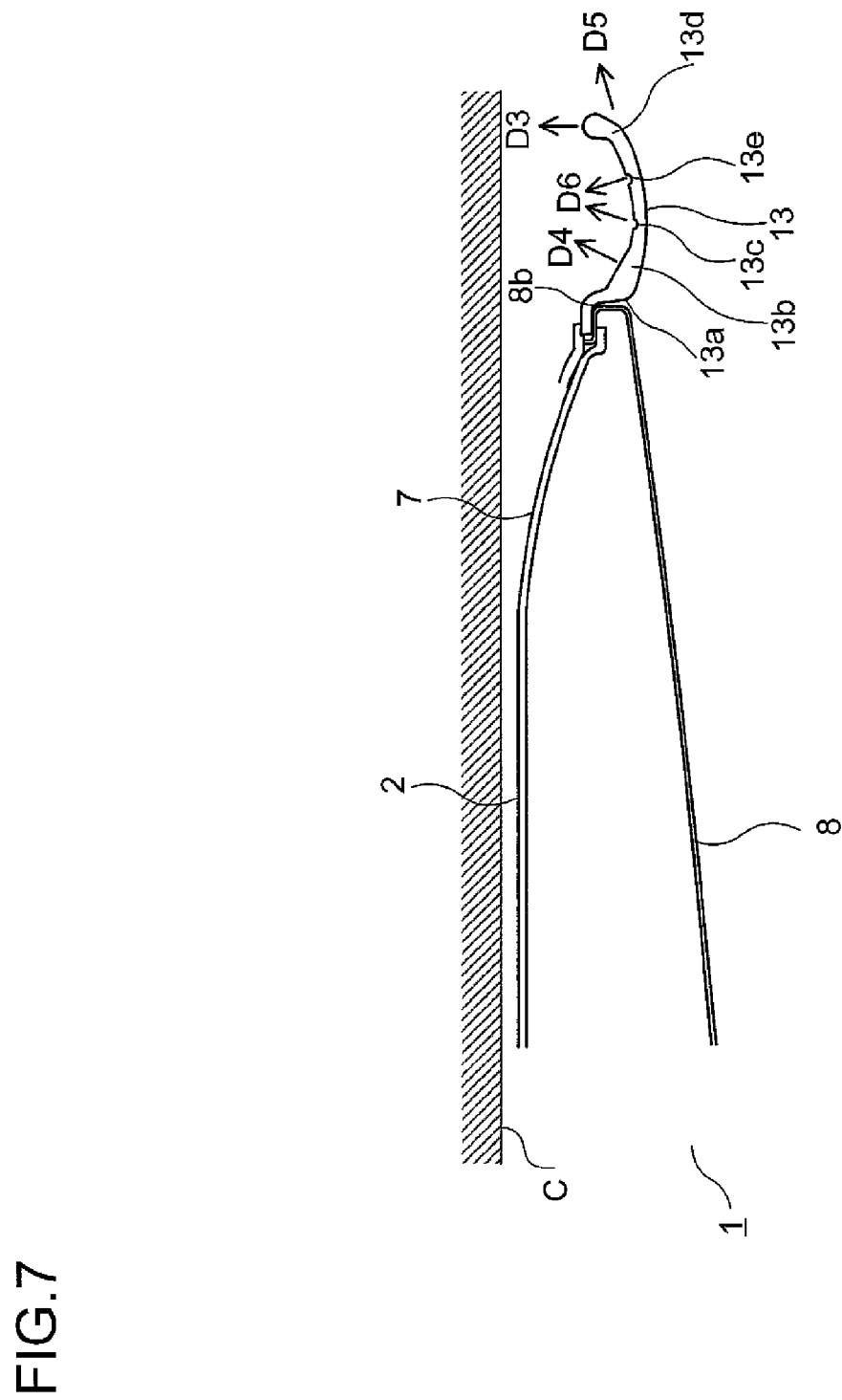
[FIG. 7] is a front sectional view showing a relevant portion of an illumination appliance of a fourth embodiment of the present invention.

Next, FIG. 7 is a front sectional view showing a relevant portion of an illumination appliance of a fourth embodiment. For the sake of convenience in explanation, like parts corresponding to those in the foregoing third embodiment shown in FIG. 6 are denoted by the same reference symbols. In this embodiment, a light guide plate 13 configured similarly to that in the third embodiment is provided with a concave portion 13e. Parts other than that are the same as those in the third embodiment.

On an installation surface C side of the light guide plate 13, the concave portion 13e is formed to be annularly concave, and a plurality of the concave portions 13e are concentrically provided. Part of light guided by the light guide plate 13 is diffusely emitted to the installation surface C side via the concave portions 13e as shown by an arrow D6. Thus, in addition to obtaining similar effect to that provided by the third embodiment, it is possible to uniformly illuminate the installation surface C in an area thereof above the light guide plate 13. In this case, when the illumination appliance 1 is seen from below, stripes attributable to the concave portions 13e are visually recognized, and thus an aesthetic impression with increased occurrence of stripes can be achieved.

A multitude of annular concave portions 13e may be provided, or alternatively, a multitude of dot-shaped concave portions 13e may be formed. By appropriately changing the shape and number of concave portions 13e used, the installation surface C can be more uniformly illuminated. Furthermore, a concave portion configured similarly to the concave portion 13e may be provided also in the other embodiments.

Figure 8:
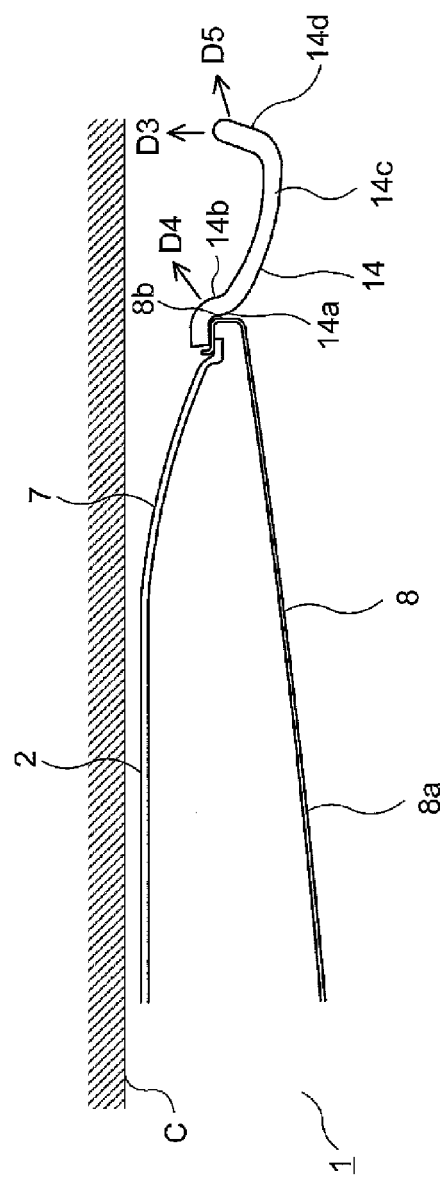
[FIG. 8] is a front sectional view showing a relevant portion of an illumination appliance of a fifth embodiment of the present invention.

Next, FIG. 8 is a front sectional view showing a relevant portion of an illumination appliance of a fifth embodiment. For the sake of convenience in explanation, like parts corresponding to those in the foregoing third embodiment shown in FIG. 6 are denoted by the same reference symbols. In this embodiment, a light guide plate 14 shaped differently from the light guide plate 13 of the third embodiment is provided. Parts other than that are the same as those in the third embodiment.

Similarly to the foregoing light guide plate 13 shown in FIG. 6, the light guide plate 14 is made of a transparent member of acrylic resin or the like and has an incidence portion 14b, an extended portion 14c, and a bent portion 14d. An incidence surface 14a of the incidence portion 14b faces the center direction of the main body housing 2, is opposed to the peripheral surface 8b of the transmissive cover 8, and is formed to be substantially perpendicular to the installation surface C. The extended portion 14c extends in the radial direction from a lower end of the incidence portion 14b and is so curved as to be convex downward. Furthermore, the extended portion 14c is so inclined as to descend on an outer peripheral side thereof At an outer peripheral portion of the light guide plate 14, the bent portion 14d is bent from an end portion of the extended portion 14c toward the installation surface C. In this case, the bent portion 14d is inclined with respect to the installation surface C. Furthermore, the incidence portion 14b, the extended portion 14c, and the bent portion 14d are formed to be substantially equal in thickness.

According to this embodiment, similar effect to that provided by the third embodiment can be obtained. Furthermore, since the extended portion 14c of the light guide plate 14 is so inclined as to descend on the outer peripheral side thereof, the bent portion 14d is disposed at a position lower in level compared with the bent portion 13d (see FIG. 6) of the third embodiment. Thus, light emitted from an outer peripheral surface of the bent portion 14d as shown by the arrow D5 is emitted from a position lower in level, so that a wider area of the installation surface C can be illuminated.

Figure 9:
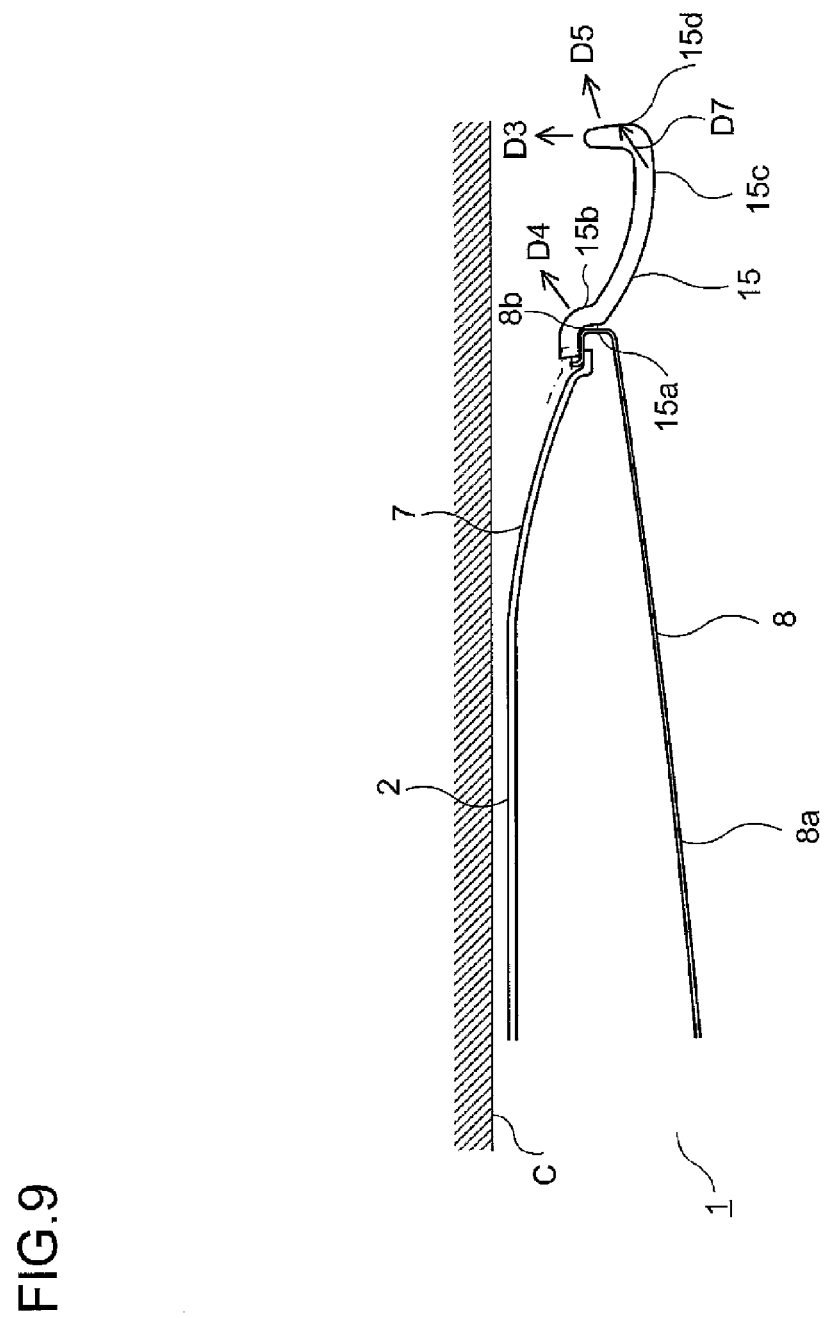
[FIG. 9] is a front sectional view showing a relevant portion of an illumination appliance of a sixth embodiment of the present invention.

Next, FIG. 9 is a front sectional view showing a relevant portion of an illumination appliance of a sixth embodiment. For the sake of convenience in explanation, like parts corresponding to those in the foregoing fifth embodiment shown in FIG. 8 are denoted by the same reference symbols. In this embodiment, a light guide plate 15 shaped differently from the light guide plate 14 of the fifth embodiment is provided. Parts other than that are the same as those in the fifth embodiment.

Similarly to the foregoing light guide plate 14 shown in FIG. 8, the light guide plate 15 is made of a transparent member of acrylic resin or the like and has an incidence portion 15b, an extended portion 15c, and a bent portion 15d. An incidence surface 15a of the incidence portion 15b faces the center direction of the main body housing 2, is opposed to the peripheral surface 8b of the transmissive cover 8, and is formed to be substantially perpendicular to the installation surface C. The extended portion 15c extends in the radial direction from a lower end of the incidence portion 15b and is so curved as to be convex downward. Furthermore, the extended portion 15c is so inclined as to descend on an outer peripheral side thereof.

At an outer peripheral portion of the light guide plate 15, the bent portion 15d is bent from an end portion of the extended portion 15c toward the installation surface C. In this case, the bent portion 15d is formed to be substantially perpendicular to the installation surface C. Furthermore, the incidence portion 15b, the extended portion 15c, and the bent portion 15d are formed to be substantially equal in thickness.

According to this embodiment, similar effect to that provided by the fifth embodiment can be obtained. Furthermore, the bent portion 15d of the light guide plate 15 is formed to be substantially perpendicular to the installation surface and thus has a larger bending angle with respect to the extended portion 15c compared with that of the bent portion 14d (see FIG. 8) of the fifth embodiment. Because of this, light guided by the light guide plate 15 to reach an outer peripheral surface of the bent portion 15d as shown by an arrow D7 becomes incident on the outer peripheral surface at an increased incidence angle. With this configuration, the amount of light emitted from the outer peripheral surface of the bent portion 15d as shown by the arrow D5 is increased, and thus an outer side of the light guide plate 15 can be made brighter.

Figure 10:
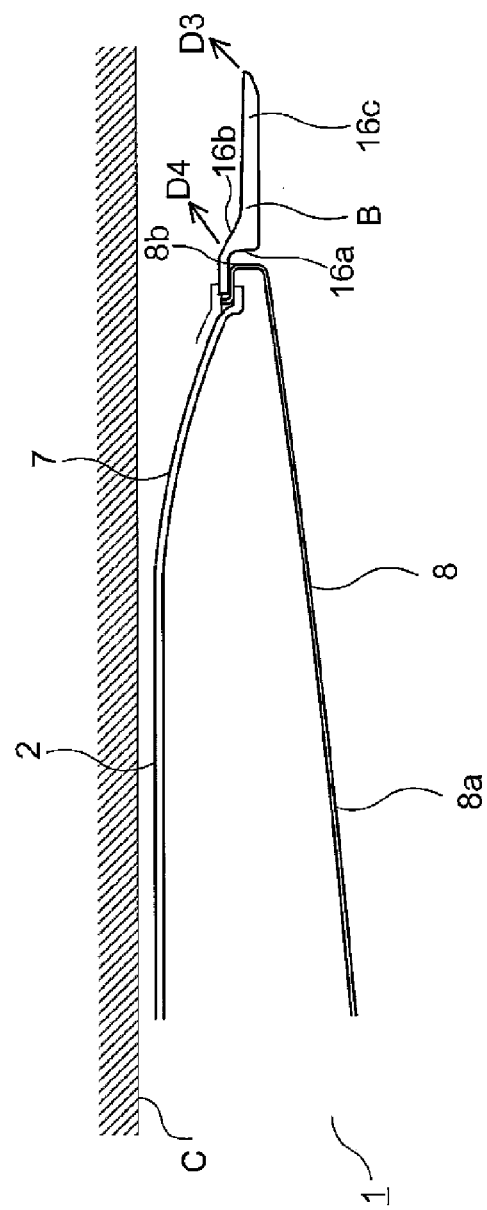
[FIG. 10] is a front sectional view showing a relevant portion of an illumination appliance of a seventh embodiment of the present invention.

Next, FIG. 10 is a front sectional view showing a relevant portion of an illumination appliance of a seventh embodiment. For the sake of convenience in explanation, like parts corresponding to those in the foregoing first embodiment shown in FIGS. 1 to 4 are denoted by the same reference symbols. In this embodiment, a light guide plate 16 shaped differently from the light guide plate 11 of the first embodiment is provided. Parts other than that are the same as those in the first embodiment.

Similarly to the foregoing light guide plate 11 shown in FIG. 4, the light guide plate 16 is made of a transparent member of acrylic resin or the like and has an incidence portion 16b and an extended portion 16c. An incidence surface 16a of the incidence portion 16b faces the center direction of the main body housing 2, is opposed to the peripheral surface 8b of the transmissive cover 8, and is formed to be substantially perpendicular to the installation surface C. Furthermore, similarly to the third embodiment (see FIG. 6), the incidence portion 16b is formed to have thickness that is larger in the vicinity of the incidence surface 16a than at a position distant from the incidence surface 16a.

The extended portion 16c extends substantially horizontally in the radial direction from a lower end of the incidence portion 16b. With this configuration, light is emitted from a tip end of the extended portion 16c as shown by the arrow D3 and illuminates the installation surface C. Here, no counterpart of the bent portion 11d (see FIG. 4) bent from an end portion of the extended portion 16c is not provided.

According to this embodiment, similarly to the first embodiment, light is guided in the radial direction by the light guide plate 16 surrounding the outer periphery of the main body housing 2 and used to illuminate the installation surface C. Thus, by guiding emission light from the peripheral surface 8b of the transmissive cover 8 to the outer side of the main body housing 2, a wide area of the installation surface C can be illuminated without decrease in amount of illumination light in the direction opposite to the installation surface C.

Furthermore, similarly to the third embodiment, light emitted from the incidence portion 16b as shown by the arrow D4 is decreased, and light that becomes incident through the incidence surface 16a and is guided is increased. Thus, an outer side of the light guide plate 16 can be illuminated with increased brightness.

Figure 11:
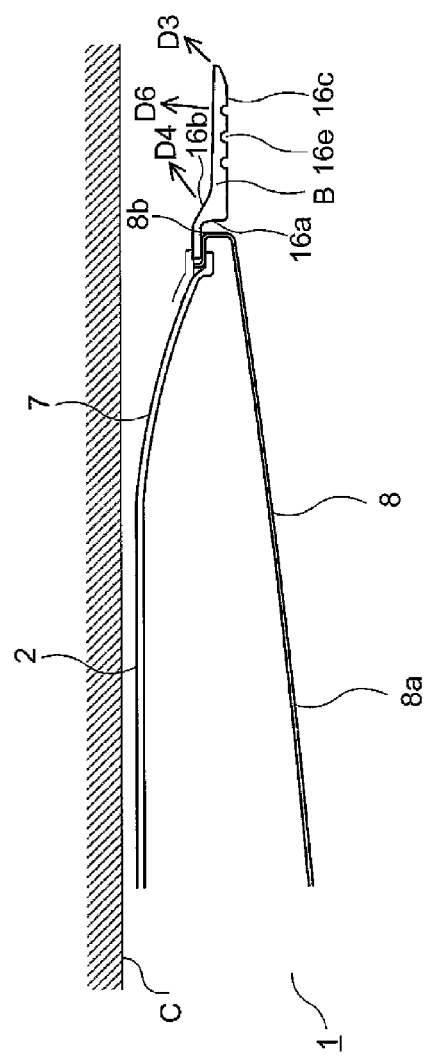
[FIG. 11] is a front sectional view showing a relevant portion of an illumination appliance of an eighth embodiment of the present invention.

Next, FIG. 11 is a front sectional view showing a relevant portion of an illumination appliance of an eighth embodiment. For the sake of convenience in explanation, like parts corresponding to those in the foregoing seventh embodiment shown in FIG. 10 are denoted by the same reference symbols. In this embodiment, a light guide plate 16 configured similarly to that in the seventh embodiment is provided with a concave portion 16e. Parts other than that are the same as those in the seventh embodiment.

On a side of the light guide plate 16 opposite to the installation surface C, the concave portion 16e is formed to be annularly concave, and a plurality of the concave portions 16e are concentrically provided. Part of light guided by the light guide plate 16 is diffusely emitted to the installation surface C side via the concave portions 16e as shown by the arrow D6. Thus, in addition to obtaining similar effect to that provided by the seventh embodiment, it is possible to uniformly illuminate the installation surface C in an area thereof above the light guide plate 16. In this case, when the illumination appliance 1 is seen from below, stripes attributable to the concave portions 16e are visually recognized, and thus an aesthetic impression with increased occurrence of stripes can be achieved.

A multitude of annular concave portions 16e may be provided, or alternatively, a multitude of dot-shaped concave portions 16e may be formed. By appropriately changing the shape and number of the concave portions 16e used, the installation surface C can be more uniformly illuminated. Furthermore, a concave portion configured similarly to the concave portion 16e may be provided also in the other embodiments.

Next, description is given of a ninth embodiment. In this embodiment, a light guide plate 11 configured similarly to and having the same shape as that in the foregoing first embodiment shown in FIGS. 1 to 4 is partly processed for non-glare surface treatment. Parts other than that are the same as those in the first embodiment.

Figure 12:
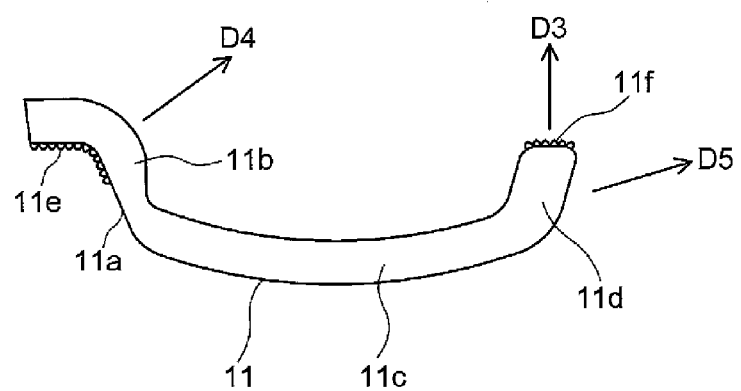
[FIG. 12] is a front sectional view showing a light guide plate of an illumination appliance of a ninth embodiment of the present invention.

FIG. 12 is a front sectional view of the light guide plate 11 of this embodiment. For the sake of convenience in explanation, like parts corresponding to those in the foregoing first embodiment shown in FIGS. 1 to 4 are denoted by the same reference symbols. Through surface texturing or the like, non-glare surface treatments 11e and 11f are applied to tip ends of an incidence surface 11a and a bent portion 11d of the light guide plate 11, respectively.

By the non-glare surface treatment 11e, light that becomes incident on the light guide plate 11 through the incidence surface 11a is diffused. Thus, light emitted from an incidence portion 11b as shown by the arrow D4 is diffused. Furthermore, by the non-glare surface treatment 11f, light emitted from the tip end of the bent portion 11d is diffused. This reduces variation in illuminance level at the installation surface C (see FIG. 4) in an area thereof above the light guide plate 11 and thus can prevent stripes attributable to the shape of the light guide plate 11 from occurring on the installation surface C.

Figure 13:
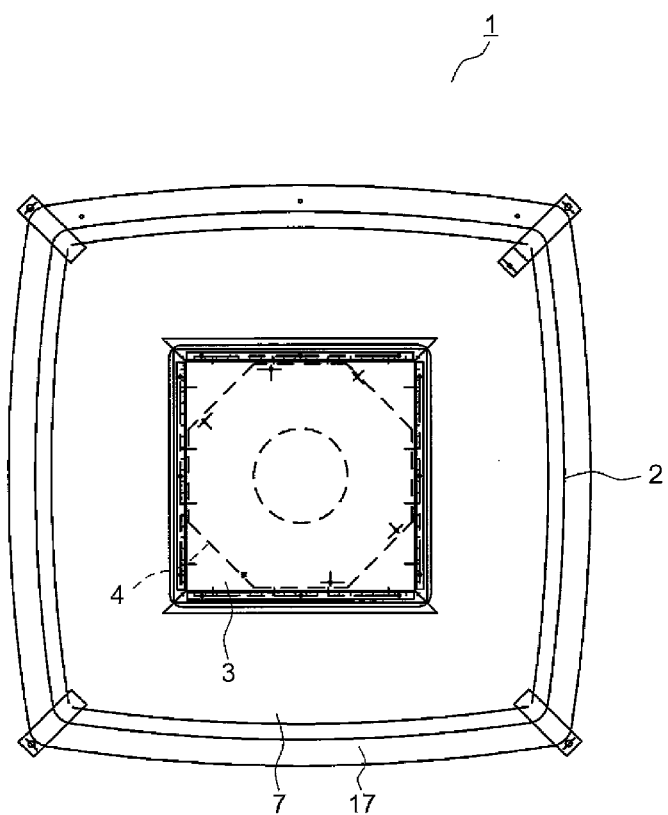
[FIG. 13] is a top view showing an illumination appliance of a tenth embodiment of the present invention.
Figure 14:
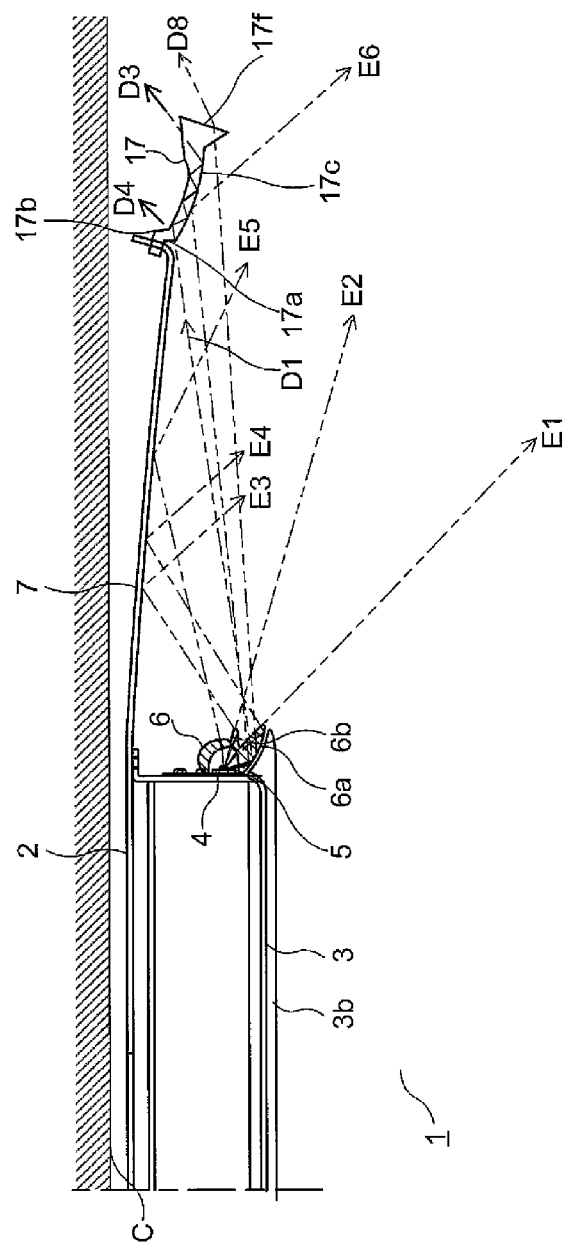
[FIG. 14] is a front sectional view showing a relevant portion of the illumination appliance of the tenth embodiment of the present invention.

Next, FIGS. 13 and 14 are a top view and a front sectional view, respectively, showing an illumination appliance of a tenth embodiment. For the sake of convenience in explanation, like parts corresponding to those in the foregoing first embodiment shown in FIGS. 1 to 4 are denoted by the same reference symbols. In this embodiment, a main body housing 2 is formed in a substantially rectangular shape in planar view, and the transmissive cover 8 (see FIG. 3) is not provided. Furthermore, a light guide plate 17 shaped differently from the light guide plate 11 of the first embodiment is provided. Parts other than these are the same as those in the first embodiment.

An electrical part 3 of the main body housing 2 is arranged at a center portion of the main body housing 2 and formed in a rectangular shape in planar view. In the electrical part 3, a plurality of substrates 4 each having a light source 5 such as an LED mounted thereon are arranged in a polygonal shape in planar view. A reflection cover 7 is formed in a substantially rectangular shape in planar view and is provided on an outer peripheral side of the electrical part 3 on the installation surface C side.

An optical member 6 that covers the light source 5 is mounted to each of the substrates 4. The optical member 6 transmits therethrough light from the light source 5 that has become incident thereon from an inner peripheral side thereof, and emits the light to an outer peripheral side thereof. At this time, the optical member 6 refracts the light being transmitted therethrough in a desired direction and causes the light to be reflected off a plurality of reflection surfaces 6a and 6b.

Similarly to the foregoing light guide plate 11 shown in FIG. 4, the light guide plate 17 is made of a transparent member of acrylic resin or the like and has an incidence portion 17b and an extended portion 17c. An incidence surface 17a of the incidence portion 17b is formed to face a center direction of the main body housing 2. The extended portion 17c extends in a radial direction from a lower end of the incidence portion 17b and is so curved as to be convex downward.

At an outer peripheral portion of the light guide plate 17, a prism 17f having a substantially triangular sectional shape is provided so as to be continuous with the extended portion 17c and to protrude downward. The incidence portion 17b and the extended portion 17c are formed to be substantially equal in thickness. Here, no counterpart of the bent portion 11d (see FIG. 4) bent from an end portion of the extended portion 17c in the direction to the installation surface C is not provided.

In the illumination appliance 1 configured as above, light emitted from the light sources 5 is transmitted through the optical members 6. With light guided from the optical members 6 to the side opposite to the installation surface C as shown by arrows E1 and E2, the down side of the illumination appliance 1 is illuminated. Furthermore, light guided from the optical members 6 to the reflection cover 7 as shown by arrows E3, E4, and E5 is reflected off the reflection cover 7 and illuminates the down side. Light that has reached a lower surface of the light guide plate 17 from the optical members 6 as shown by an arrow E6 is reflected off the light guide plate 17 and illuminated the down side.

Light (arrow D1) travelling from the optical members 6 in the radial direction of the illumination appliance 1 becomes incident on the light guide plate 17 through the incidence surface 17a. As shown by the arrow D3, light guided by the light guide plate 17 is emitted via the extended portion 17c toward the installation surface C over a predetermined area. As a result, the installation surface C is illuminated in an area thereof around an area covered by the main body housing 2.

Furthermore, with light emitted from the incidence portion 17b as shown by the arrow D4, the installation surface C is illuminated in an area thereof above the light guide plate 17.

Furthermore, as shown by an arrow D8, light guided from the optical members 6 to the prism 17f of the light guide plate 17 is refracted while being transmitted through the prism 17f and then is emitted therefrom. As a result, the installation surface C is illuminated in an area thereof on an outer side of an area covered by the light guide plate 17. At this time, in a case where light having a plurality of wavelengths is emitted from the light sources 5, emission light from the prism 17f is dispersed in accordance with the wavelengths. Thus, illumination light having different colors is shone onto the installation surface C, so that a color-coded pattern such as a rainbow pattern can be formed thereon.

According to this embodiment, similarly to the first embodiment, light is guided in the radial direction by the light guide plate 17 surrounding the outer periphery of the main body housing 2 and used to illuminate the installation surface C. Thus, by guiding light that has reached the incidence surface 17a from the light sources 5 to the outer side of the main body housing 2, a wide area of the installation surface C can be illuminated without decrease in amount of illumination light in the direction opposite to the installation surface C.

Furthermore, since the prism 17f is provided at a tip end of the light guide plate 17, a color-coded pattern such as a rainbow pattern can be formed on the installation surface C. The light guide plates of the other embodiments also may be provided with a similarly configured prism.

In the first to tenth embodiments, the light guide plates 11 to 17 may be formed to be divided in a circumferential direction, as long as they extend in the circumferential direction so as to surround the outer peripheral portion of the main body housing 2. Furthermore, any of the light guide plates 11 to 17 may be formed integrally with the reflection cover 7 by double molding or the like.

INDUSTRIAL APPLICABILITY

The present invention is applicable to illumination appliances that are installed on a ceiling surface or the like.

LIST OF REFERENCE SYMBOLS 1 illumination appliance
2 main body housing
3 electrical part
4 substrate
5 light source
6 optical member
7 reflection cover
8 transmissive cover
11 to 17 light guide plate
11a to 17a incidence surface
11b to 17b incidence portion
11c to 17c extended portion
11d to 15d bent portion
13e, 16e concave portion
17f prism The invention claimrd is:

1. An illumination appliance that, by using emission light from a light source provided in a main body housing thereof that is fixed to an installation surface, provides illumination in a direction opposite to the installation surface, comprising:
    a light guide plate that surrounds an outer periphery of the main body housing so as to protrude in a radial direction, has an incidence surface, and guides light,
    wherein
    light emitted from the light source becomes incident on the light guide plate through the incidence surface, and
    light emitted from the light guide plate is used to illuminate the installation surface.

2. The illumination appliance according to claim 1, wherein the light guide plate is made of a transparent member.

3. The illumination appliance according to claim 1, further comprising:
    a transmissive cover that covers a side of the main body housing opposite to the installation surface and diffusely transmits therethrough emission light from the light source,
    wherein the incidence surface is opposed to a peripheral surface of the transmissive cover and is inclined with respect to the installation surface.

4. The illumination appliance according to claim 1, wherein
    the light guide plate has thickness that is larger in a vicinity of the incidence surface than at a position distant from the incidence surface.

5. The illumination appliance according to claim 1, wherein
    the light guide plate has, at an outer peripheral portion thereof, a bent portion that is bent toward the installation surface.

6. The illumination appliance according to claim 1, wherein the light guide plate is provided with an annular or dot-shaped concave portion.

7. The illumination appliance according to claim 1, wherein
    the light source emits light having a plurality of wavelengths, and
    a prism that disperses and emits guided light is provided at a peripheral portion of the light guide plate.

* * * * *